Aug. 13, 1929.　　　B. WITTKUHNS　　　1,724,159
CHANGE SPEED TOOTH GEAR
Filed Sept. 6, 1928
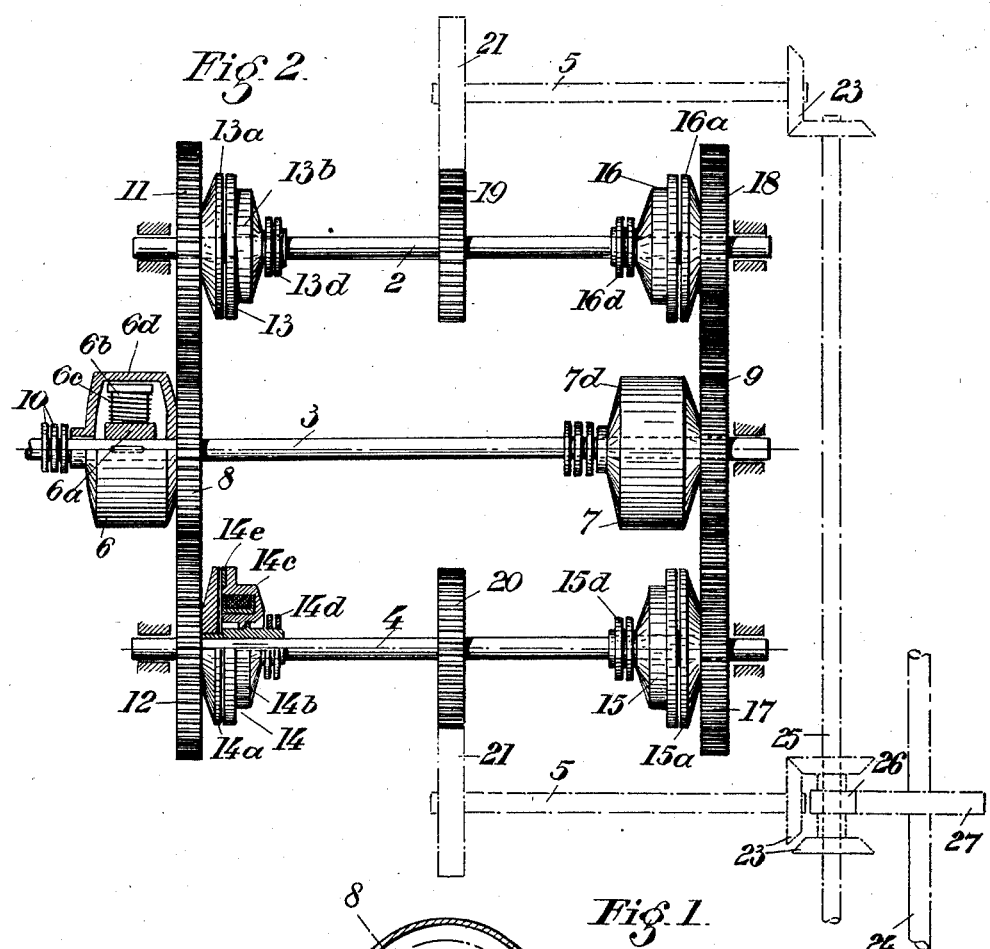
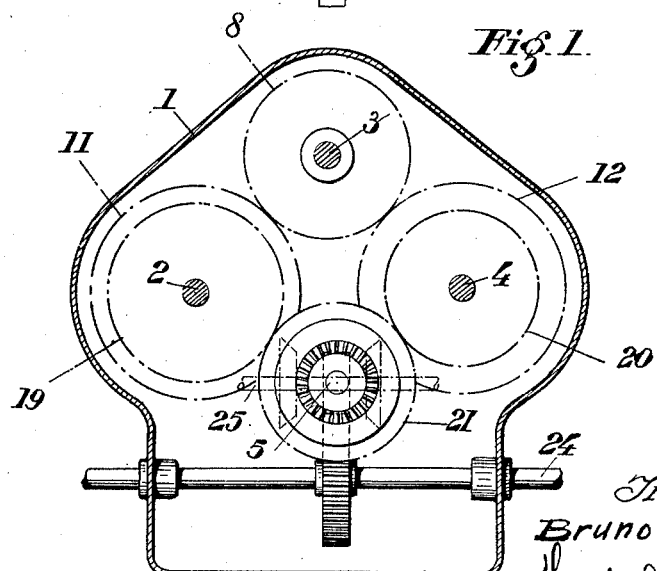
Inventor:
Bruno Wittkuhns,
By his Atty Harold D. Penney Patented Aug. 13, 1929.

1,724,159

UNITED STATES PATENT OFFICE.

BRUNO WITTKUHNS, OF NEW YORK, N. Y., ASSIGNOR TO THE FIRM MAGNET-WERK G. M. B. H., EISENACH SPEZIALFABRIK FÜR ELEKTROMAGNET-APPARATE, OF EISENACH, THURINGIA, GERMANY.

CHANGE-SPEED TOOTH GEAR.

Application filed September 6, 1928, Serial No. 304,302, and in Germany September 22, 1927.

My invention relates to a change-speed tooth-gears and more particularly to a change-speed gearing in which the toothed wheels of the several pairs which correspond with the several speeds are continuously in mesh with each other, and at least one of the wheels of each pair is loose on its shaft whereby the desired speed is thrown in by connecting one or several wheels, being otherwise loose on their shafts, with the latter by means of a clutch. The other toothed wheel of the pair corresponding with the respective speed may either be always in rigid connection with its shaft or also be provided with a clutch by which the wheel may at any time be connected with the shaft.

The gearing according to my invention is especially used for the transmission of the power in a Diesel-engine locomotive and the main object of my invention consists in effecting the change of the speeds without jerks, though without interrupting the propulsion of the driven shaft of the power transmission device and, in the case of a locomotive drive, without discontinuance of the force of traction of the locomotive.

Other objects and features of my invention will follow from the detailed specification of an embodiment of my invention which is illustrated in the accompanying drawing in which Fig. 1 is a schematic section in a plane perpendicular to the gear shafts and Fig. 2 a schematic top view with parts in section and the three gear shafts together with a double representation of the single lower gear shaft laid out into a common plane for better clearness.

1 is a casing containing the entire gear. In this casing four parallel shafts 2, 3, 4 and 5 are mounted. The shaft 3 is directly driven from the motor which in the present case is a Diesel-engine, and the drive is effected through the intermediary of a main clutch which is not represented in the drawing. On the shaft 3 two eddy-current clutches 6 and 7 and two toothed wheels 8 and 9 are mounted. As shown in the partial section of the clutch 6 each of the eddy-current clutches is provided with a cross-piece $6^a$ which is keyed to the shaft 3. The arms $6^b$ of the said cross-piece carry exciting coils $6^c$ to which the exciting current is fed by means of slip rings 10 on the shaft 3. The cross-piece $6^a$ is enclosed by a casing $6^d$ the inner side of the cylindrical wall of which is in close proximity of the magnet cores $6^b$.

The coils of the magnet cores are joined up in such a way that the polarity of the cores is alternating in the circumferential direction.

When therefore the magnet body is excited and a relative rotative motion takes place between the magnet body and the casing $6^d$, eddy currents arise in the said casing, and in combination with the magnet field of the magnet bodies $6^b$ a momentum of rotation is produced through which the magnet body being fast on the shaft 3 takes the loose casing $6^d$ with it, whereby the velocity of the casing is the less lagging behind the velocity of the magnet body, the more the coil of the latter is excited.

By regulating the excitation the difference of the speeds of the magnet body $6^a$ and the casing $6^b$ or the slip is variable within certain limits. Electro-dynamically engaging power transmission means of this class are well known as eddy-current clutches.

The second clutch 7 on the shaft 3 is of a construction which corresponds fully with that of the clutch 6. The toothed wheels 8 and 9 being loosely mounted on the shaft 3 are rigidly connected with the casing elements $6^d$ and $7^d$ of the eddy-current clutches 6 and 7. With the toothed wheel 8 two toothed wheels 11 and 12 are continuously meshing. The gear wheel 12 is loose on the shaft 4 and in rigid connection with one of the elements $14^a$ of a clutch 14, the other element $14^b$ of which is keyed to the shaft 4. The clutch 14 is an electromagnetic friction clutch of the known type. The element $14^b$ contains the exciting coil $14^c$ to which the exciting current is fed by means of slip rings $14^d$. As soon as the clutch is excited, the armature-element $14^a$ is attracted to engage a friction ring $14^e$ on the clutch element $14^b$, so that the toothed wheel 12 is connected with the shaft 4.

Another clutch 15 on the shaft 4 and also two clutches 13 and 16 on the shaft 2 are of a construction corresponding with that of the clutch corresponding with that of the clutch 14. The element $15^a$ of the clutch 15 is loose on the shaft 4 and rigidly connected with a toothed wheel 17 being also loosely mounted on the shaft 4 and continuously meshing with the toothed wheel 9 of the shaft 3. With the toothed wheel 9 also a toothed wheel 18 is continuously meshing. The wheel 18 is loose on the shaft 2 and connected with an element 16ᵃ of the clutch 16, the said element being also loosely mounted on the shaft 2, 13ᵈ, 15ᵈ and 16ᵈ are slip rings for feeding the exciting current to the several clutches.

On the shafts 2 and 4 the toothed wheels 19 and 20 are keyed. With these wheels a common toothed wheel 21 is continuously meshing which is fast on the shaft 5. This shaft is through the intermediary of a bevel gear 23 connected with a shaft 24 which is mounted, in the casing, of the transmission device and extends transversely to the direction of the shafts 2, 3, 4 and 5. From the shaft 24 the power is transmitted to the traction axle of the locomotive to which the transmission gear appertains.

The ratios of the pairs of wheels 8—11, 8—12, 9—18, 9—17 correspond with the several speeds which are obtained by selectively operating with the said pairs of wheels.

The operation of the transmission gear is as following:

First of all the driving motor is set going, so that the shaft 3 is driven from the motor. By first throwing in the clutches 14 and 15 and subsequently throwing in the clutch 6 the speed of the shaft 24 is obtained which corresponds with the ratio of the wheels 8 and 12. If now another speed for instance that corresponding with the ratio of the wheels 9 and 17 has to be thrown in, the eddy-current clutch 7 is gradually excited. As the slip of this clutch is very large on account of the considerable difference between the numbers of revolutions of the shaft 3 and the toothed wheel 9, the momentum of rotation transmitted from the magnet system being fast on the shaft 3 to the casing 7ᵈ is very strong. In consequence thereof the slip of the clutch 6 is rapidly decreased to nought and the clutch fully discharged, so that no jerks arise when throwing out the clutch. Also the transmission of the power is not interrupted in this way.

When throwing in another higher speed the conditions are exactly the same. But when going from a higher to a lower speed the conditions are different. For passing over from the speed corresponding with the ratio of the wheels 9 and 17 to the speed corresponding with the ratio of the wheels 8 and 12, the excitation of the clutch 7 is decreased, and the slip of this clutch thereby enlarged to such an extent that in consideration of the ratio of the wheels 8 and 12 the number of revolutions of the shaft 4 corresponds with the number of revolutions of the driving shaft 3.

Thereby the speed of the clutch element 6ᵃ is reduced to that of the clutch element 6ᵈ, so that when exciting the clutch 6 and throwing out the clutch 7 the passing over from one speed to the other is also effected without jerks and without discontinuance of the transmission of the driving power.

I claim:

1. In a change-speed tooth-gear a driving shaft and two driven shafts, toothed wheels being loosely mounted two by two on each of said shafts, each toothed wheel of the driving shaft continuously meshing with one and one toothed wheel of the two other shafts, electro-dynamic clutches adapted to connect one and one of said toothed wheels with their shafts and mechanical clutches adapted to connect with the respective shafts the toothed wheels gearing into the last-mentioned wheels.

2. In a change-speed tooth-gear a driving shaft and two driven shafts, toothed wheels being loosely mounted two by two on each of said shafts, each toothed wheel of the driving shaft continuously meshing with one and one toothed wheel of the two other shafts, eddy-current clutches adapted to connect one and one of said toothed wheels with their shafts, and friction clutches adapted to connect with the respective shaft the toothed wheels gearing into the last-mentioned wheels.

3. In a change-speed tooth-gear a driving shaft and two driven shafts, toothed wheels being loosely mounted two by two on each of said shafts, each toothed wheel of the driving shaft continuously meshing with one and one toothed wheel of the two other shafts, two eddy-current clutches adapted selectively to connect one of the toothed wheels on the driving shaft with the latter and magnetical friction clutches adapted to connect the toothed wheels on the driven shafts with the latter.

In testimony whereof I affix my signature.

BRUNO WITTKUHNS.